United States Patent [19]

Dadgar et al.

[11] Patent Number: 4,941,982

[45] Date of Patent: * Jul. 17, 1990

[54] CALCIUM-FREE CLEAR HIGH DENSITY FLUIDS

[75] Inventors: Ahmad Dadgar; Charles C. Shin, both of Lafayette, Ind.

[73] Assignee: Great Lakes Chemical Corporation, West Lafayette, Ind.

[ * ] Notice: The portion of the term of this patent subsequent to Nov. 15, 2005 has been disclaimed.

[21] Appl. No.: 225,347

[22] Filed: Jul. 28, 1988

Related U.S. Application Data

[63] Continuation-in-part of Ser. No. 938,866, Dec. 8, 1986, abandoned, which is a continuation-in-part of Ser. No. 892,155, Jul. 30, 1986, abandoned.

[51] Int. Cl.$^5$ .......................... E21B 43/00; C09K 7/04
[52] U.S. Cl. ................................. 252/8.551; 252/8.51; 252/8.514; 252/8.513; 252/8.555
[58] Field of Search ................. 252/8.51, 8.514, 8.551, 252/8.555, 8.513

[56] References Cited

U.S. PATENT DOCUMENTS

| | | | |
|---|---|---|---|
| 4,292,183 | 9/1981 | Sanders | 252/8.551 |
| 4,415,463 | 11/1983 | Mosier et al. | 252/8.551 |
| 4,420,406 | 12/1983 | House et al. | 252/8.551 |
| 4,427,556 | 1/1984 | House et al. | 252/8.551 |
| 4,554,081 | 11/1985 | Borchardt et al. | 252/8.551 |
| 4,609,476 | 9/1986 | Heilweil | 252/8.551 |
| 4,615,740 | 10/1986 | Pelezo et al. | 252/8.551 |
| 4,619,773 | 10/1986 | Heilweil et al. | 252/8.551 |
| 4,784,779 | 11/1988 | Dadgar | 252/8.551 |

FOREIGN PATENT DOCUMENTS

| | | | |
|---|---|---|---|
| 2076686 | 2/1980 | United Kingdom | 252/8.555 |
| 2121397 | 12/1983 | United Kingdom | 252/8.555 |

*Primary Examiner*—John S. Maples
*Assistant Examiner*—Gary L. Geist

[57] ABSTRACT

Clear high density fluids for use as completion, packing and perforation media in oil and gas well formations having high carbonate and/or high sulfate ion concentration are formulated from aqueous solutions of zinc bromide and one or more alkali metal bromides and have densities lying in the range of about 15.0 to 20.5 lb./gal and a pH lying in the range of about 1.0 to 5.5, with the alkali metal bromide being provided in an amount approaching its solubility limit in water.

7 Claims, No Drawings

CALCIUM-FREE CLEAR HIGH DENSITY FLUIDS

CROSS-REFERENCE

This application is a continuation-in-part of applicants' copending application, Ser. No. 938,866, filed Dec. 8, 1986, now abandoned, which was in turn, a continuation-in-part of application Ser. No. 892,155, filed July 30, 1986 now abandoned.

BACKGROUND OF THE INVENTION

1. Field of the Invention

The present invention relates to the preparation and use of solids-free fluids for oil and gas drilling, completion and workover operations. More particularly, the invention relates to new calcium-free fluids which may be used as completion, packer and perforating media in oil and gas drilling and completion operations when formations have high carbonate and/or high sulfate ion concentrations.

2. Description of the Prior Art

Special fluids known as drilling fluids are used in the drilling, completion, and workover of oil and gas wells. These fluids ideally perform the following functions: transport drill cuttings or solids debris to the surface suspend cuttings and solids in lost circulation zones counteract formation pressure; maintain borehole stability: cool and lubricate downhole equipment; aid the suspension of tool string and casing; minimize corrosion; and minimize damage to formation permeability.

Use of these drilling fluids has greatly increased the efficiency of operations at the well. However, problems with certain applications of these fluids have been encountered. For example, when used in completion operations, these fluids leave a deposit of acid-insoluble filter cake in the bore hole which blocks production and is difficult to remove. Further, use of these fluids may permit entry of fresh water mud filtrates which can promote the hydration of naturally occurring clay materials which swell in volume and restrict permeability. Finally, because of the high alkalinity of many of these fluids, precipitation of insoluble hydroxides occurs along the filtration path, impeding production. These problems have been partially overcome by underreaming or acidizing of the bore hole if the damage is not severe.

In recent years, however, specialized solids-free completion and workover fluids have been developed to help prevent this type of damage to formation permeability. These solids-free fluids are placed across the production zone during completion and workover operations performing the same functions as drilling fluids but minimizing formation damage. These solids-free completion fluids comprise concentrated salt-water solutions in the density range of about 10 to 21 pounds per gallon ("lb/gal" or "ppg") and may be used as perforation, gravel pack, packer, and workover media. Examples of these solutions include aqueous solutions of alkali and alkaline earth metal and zinc halides such as sodium chloride, sodium bromide, calcium chloride, calcium bromide, zinc bromide or mixtures thereof.

As disclosed in 1964 in U.S. Pat. No. 3,126,950 ("'950"), concentrated solutions of zinc chloride and/or calcium chloride can be prepared and used as well completion fluids up to a density of about 17 lb/gal. As noted in the '950 patent, however, zinc chloride/calcium chloride solutions with densities greater than 14 lb/gal. have high ferrous metal corrosion rates and therefore cannot practically be used with most well and surface equipment. Further, solutions with densities in the 14 lb/gal. range are not highly effective for deep well drilling. As a result of these limitations, these completion fluids did not receive strong acceptance in the oil and gas industry.

Other solids-free completion fluids have been better received. These fluids comprise calcium bromide, calcium chloride, and water and have densities up to 15.1 lb/gal. See Plonka, "New Bromide Packer Fluids Cut Corrosive Problems," World Oil, April 1972, and Paul and Plonka "Solids-Free Completion Fluids Maintain Formation Permeability," SPE 4655, Las Vegas, Sept. 30–Oct. 3, 1973. Unlike the fluids in the '950 patent, calcium bromide/calcium chloride fluids have very low corrosion rates, which can be further reduced with the addition of suitable corrosion inhibitors. Density limitations (15.1 lb/gal limit) and high crystallization point temperatures (68° F.) of the calcium bromide/calcium chloride fluids, however, have made these fluids less than ideal for use in completion operations. Therefore demands for other new solids-free completion fluids have continued.

Another new system of completion fluids in the density range of 15.0 to 19.2 lb/gal was disclosed in 1981 in U.S. Pat. No. 4,292,183, ("'183"). The '183 patent teaches mixtures of zinc bromide, calcium bromide, calcium chloride, and water which contain corrosion inhibitors capable of reducing the corrosion rate of mild steel coupons to less than 10 mpy at 250° F.

Although the introduction of these various new completion fluids have helped resolve many of the difficulties encountered in completion and workover operations, problems still remain. For example, use of completion fluids with significant zinc and calcium ion concentrations in subterranean wells containing carbonate or carbon dioxide result in precipitation of calcium and zinc carbonates. Further, it has been reported by Shaughnessy, et al. in "Workover Fluids for Prudhoe Bay," February–July 1977 that the mixing of calcium chloride workover fluids with formation brines under certain conditions (i.e., at a pressure of 5000 psi and a temperature of 220° F.) can lead to the precipitation of calcium carbonate within reservoir rock and, therefore, to formation damage. These problems have been partially resolved by utilizing sodium bromide completion and workover fluids in place of calcium containing solutions. However, sodium bromide solutions can only be used in shallow wells where high formation pressures are not encountered. Further, more recently, carbon dioxide or carbonate containing wells have been discovered which require drilling and completion fluids with fluid densities of at least 14–20 lb/gal, density ranges which are well above those of sodium bromide.

The prior art generally describes solutions formulated from zinc and calcium bromides and various alkali metal bromides. However, the art has not heretofore taught the combination in calcium-free solutions of zinc bromide with one or more alkali metal bromides within the high density range (i.e.. up to about 20.5 pounds per gallon. Borchardt, et al. U.S. Pat. No. 4,554,081 is particularly concerned with brine additives for reducing fluid loss. The patentee teaches that such brines "typically contain KCl, NaCl, CaCl$_2$, NaBr, CaBr$_2$, ZnCl$_2$ and ZnBr$_2$, or combinations of such salts . . . " (Column 1, lines 47-50). The patent further notes that the salt(s) may be dissolved in water such that the resulting densities range from about 9.0 to 21.5 pounds per gallon. However, the patent does not recognize the dangers posed by using high density calcium containing fluids, and it discloses no high density calcium free fluids at all. Thus, in Example II and Table I there are disclosed 11.7 ppg calcium chloride solutions and 10.8 ppg sodium bromide solutions. The only mixed salt solutions all contain calcium salts (e.g. $CaBr_2/CaCl_2$ and $ZnBr_2/CaBr_2$). Examples III and IV are to the same effect. No combination of zinc bromide and one or more alkali metal bromide solutions is anywhere exemplified or otherwise disclosed by Borchardt, et al.

Heilweil U.S. Pat. No 4,609,476 and Heilweil, et al. U.S. Pat. No. 4,619,773 each describe high temperature stable aqueous brines. Heilweil notes the problems posed by brines containing divalent salts of calcium and zinc, and suggests that the utility of sodium bromide brines as an alternative has been limited by the lack of proper viscosifying agents (Column 2, lines 24–34.) The patent discusses brines containing densifying salts such as LiCl, NaCl, $CaCl_2$, $CaBr_2$, $ZnBr_2$ and their mixtures (Column 6, lines 5–6). The only fluids exemplified in the patent are NaBr and $CaBr_2$ fluids (see columns 5 and 6 of the reference). As in the case of Borchardt, et al., there is no hint of combining zinc bromide and one or more alkali metal bromides in a calcium-free high density fluid. This omission is particularly significant in the case of Heilweil because of its appreciation of the problems posed by divalent brines.

Heilweil et al. also note the problems posed by divalent calcium and zinc containing fluids, but also fail to teach applicants' solution to the problem. Instead, Heilweil, et al. contain the same conventional teaching of aqueous solutions of various weighting salts without recognizing the advantages of the specific combination of zinc bromide and one or more alkali metal bromides as called for in the subject application (see column 6, lines 38–55). Just as in Heilweil, the Heilweil, et al. patent exemplifies sodium bromide brines and calcium bromide brines, but fails totally to appreciate or hint at the discoveries made by applicants herein.

Pelozo, et al., U.S. Pat. No. 4,615,740 describes a liquid polymer containing fluid incorporating a soluble salt, preferably sodium chloride and/or calcium chloride. (See column 4, lines 26–34.) The examples disclose a series of mono-salt solutions containing NaCl, NaBr, $CaCl_2$, $CaBr_2$, and $ZnBr_2$. Mixed salt solutions of $CaCl_2/CaBr_2$ and $CaCl_2/CaBr_2/ZnBr_2$ are also described. (See Tables III and V in columns 5 and 6). The only high density calcium-free solution disclosed is a 19.2 ppg $ZnBr_2$ solution, but the patent does not recognize that a zinc bromide solution of that density is unsuitable for use as a well completion fluid. Nor does the reference teach that useful calcium-free fluids can only be obtained with a combination of zinc bromide and one or more alkali metal bromides.

It is thus a primary object of the present invention to develop high density completion fluids that may be successfully used in sulfate and/or carbonate-containing wells, in the density range of 15.0 to 20.5 lb/gal.

It is a further object of the invention to develop high density completion fluids having pH values in the range of 1.0 to 5.5 for use in sulfate and/or carbonate containing wells.

An additional object of the invention is to develop high density calcium-free completion fluids for use in carbonate and/or sulfate containing wells which are economical.

Another object of the present invention is to develop high/density calcium-free completion fluids which may also contain corrosion inhibitors and viscosifying agents for downhole applications.

Further objects and uses of the present invention will also be obvious from the following disclosure.

SUMMARY OF THE INVENTION

The foregoing objects, advantages and features of this invention may be achieved with high-density calcium-free fluids adapted for use as completion, packing, and perforation media in well formations having high carbonate and/or sulfate concentrations comprising aqueous solutions of about 20 up to about 56, preferably about 30 up to about 44, percent by weight zinc bromide and about 14, preferably about 25, up to about 40 percent by weight of one or more alkali metal bromide and having densities in the range of about 15.0 to about 20.5 lb/gal and pH values in the range of about 1.0 to 5.5, with the alkali metal bromide being provided in an amount approaching its solubility limit in the solution. Suitable alkali metal bromides include bromides of lithium, sodium and potassium as well as mixtures thereof. These solutions may also contain corrosion inhibitors to provide a non-corrosive environment for downhole applications, and viscosifiers for more effective use.

In its method aspect, the present invention involves injecting a high density calcium-free fluid into wells having a high carbonate and/or sulfate ion concentration.

The novelty of the fluids of this invention is that, contrary to the expectations of those skilled in the art, solutions obtained by substituting one or more alkali metal bromides for calcium bromide in zinc bromide/calcium bromide fluids may be used without precipitation of zinc salts when applied to carbonate and/or sulfate containing formation brines.

DETAILED DESCRIPTION OF THE PREFERRED EMBODIMENT

Calcium-free solutions for use as completion fluids in oil and gas formations containing high carbonate and/or sulfate ion concentrations have been prepared. These solutions comprise mixtures of zinc bromide and one or more alkali metal bromide and water and have densities in the range of up to about 20.5 lb/gal, especially about 15.0 to 20.5 lb/gal and preferably about 15.0–19.2 lb/gal, and pH values of about 1.0 to 7.5, preferably about 2.5 to 5.5. The alkali metal bromide(s) are employed in amounts approaching their solubility limits in water.

Suitable alkali metal bromides which may be used in accordance with this invention include sodium bromide, potassium bromide, and lithium bromide. Mixtures of alkali metal bromides, especially mixtures of sodium and potassium bromides, may also be employed.

The relative concentrations or amounts of the different salt constituents used in these completion fluids are not critical and may be determined by convenience so long as the density and pH limitations are maintained. In general, the levels of zinc bromide and alkali metal bromides (LiBr, KBr, or NaBr) in these calcium-free fluids fall within the range of about 20–56 wt. % and 14–40 wt. %, respectively. Preferably these compositions comprise about 30 to 44% zinc bromide and 25 to 40% alkali metal bromide(s) by weight of the overall compositions.

The alkali metal bromide(s) are most desirably employed at high levels, that is in amounts approaching their solubility limits in the solution. In the case of lithium bromide, sodium bromide and potassium bromide, their solubility limits in water are, respectively, 54, 46 and 38 percent by weight. However, the total dissolved solids in 19.2 ppg $ZnBr_2$/KBr or $ZnBr_2$/NaBr is about 78%. Since the solutions contain only about 22% available water to dissolve both the zinc bromide (44%) and the KBr (36%) or NaBr (35%), it is readily apparent that the monovalent alkali metal bromides are at or near their solubilities in these solutions.

Therefore, in accordance with this invention, the alkali metal bromides should be employed at high levels, preferably in the range of about 14–40 weight percent, preferably about 25–40 weight percent. Thus, the term "in an amount approaching its solubility limit in the solution," as used herein, should be understood to encompass the use of alkali metal bromide(s) in the range of about 14–40 per cent by weight.

In the case of the zinc bromide/sodium bromide fluids, the densities lie in the range of about 12.5 to 19.2 lb/gal, preferably about 15.0 to 19.2 lb/gal. Density of zinc bromide/potassium bromide fluids lie in the range of about 11.5 to 19.2 lb/gal, preferably about 15.0 to 19.2 lb/gal. Zinc bromide/lithium bromide fluids have densities lying in the range of about 13.5 to 18.0 lb/gal, preferably about 15.0 to 18.0 lb/gal., and fluids composed of zinc bromide/sodium bromide/potassium bromide have densities of about 13.0 to 18.0 lb/gal, preferably about 15.0 to 18.0 lb/gal.

The calcium free solutions of the present invention may be prepared by mixing a zinc bromide/alkali metal bromide base fluid with one or more monovalent alkali metal bromide solutions. The zinc bromide/alkali metal bromide base fluids may be prepared by combining solid zinc bromide and water with a solid alkali metal bromide or an aqueous solution thereof. The zinc bromide/alkali metal bromide base fluids may also be prepared by dissolving dry alkali metal bromide(s) in aqueous zinc bromide solutions. For example, a 17.5 lb/gal. $ZnBr_2$/NaBr base fluid is prepared by adding 14.8 g water to 60.8 g 77 wt% $ZnBr_2$ solution, and then dissolving 24.4 g 97% NaBr in the resulting solution to prepare 100 g fluid. Different $ZnBr_2$/NaBr blends in the density range of 13.0–17.5 lb/gal. may be prepared by mixing appropriate volumes of 17.5 lb/gal. $ZnBr_2$/NaBr base fluid with 12.5 lb/gal. NaBr (46.0 wt. % NaBr in water).

Corrosion inhibitors such as thioglycolates and thiocyanates which effectively control corrosion rates of mild steel may also be added to the completion fluids of the present invention to control corrosion of downhole equipment. The reason for the use of corrosion inhibitors is that completion fluids which contain zinc bromide are more corrosive than fluids formulated with alkali and alkaline earth metal bromides (ie., LiBr, NaBr, KBr and $CaBr_2$). Therefore corrosion inhibitors are generally used when zinc bromide is present. British Pat. No., GB 2 027 687, and German patent, Ger. offen. No. DE 3 316 677 A11, disclose the use of various corrosion inhibitors, such as thioglycolates and thiocyanates, in zinc containing fluids. Suitable corrosion inhibitors which are capable of assisting in the control of corrosion with the calcium-free fluids of this invention include alkali metal and ammonium thiocyanates and thioglycolates, calcium thioglycolate and mixtures thereof. In addition, especially preferred corrosion inhibitors for use in the solutions of this invention, most especially those containing 50 wt. % $ZnBr_2$ or more, are disclosed in copending U.S. patent application Ser. No. 913,409, filed Sept. 30, 1986. The corrosion inhibitors in accordance with the Ser. No. 913,409 application include calcium thiocyanate and a mixture of sodium thiocyanate, ammonium thioglycolate, and sodium ascorbate or gluconic acid.

Viscosifiers may also be added to the completion fluids of the present invention to help increase these fluids' ability to suspend and remove cuttings from the well and to prevent significant loss of fluids to the formation. Natural polymers such as guar gum, xanthan gum, and hydroxyethyl cellulose ("HEC") may be used as viscosifier additives in drilling and completion fluids. Only HEC has been used extensively as a viscosifier for drilling and completion fluids in the density range of 10 to 19.2 lb/gal. HEC polymer, solvated with ethylene glycol or suspended in mineral oil, has been used to viscosify aqueous NaBr, $CaCl_2$, $CaBr_2$, and $ZnBr_2$ brines in the density range of 10.0 to 15.0 and from 16.5 to 19.2 lb/gal. This viscosifier however fails to viscosify zinc ion-containing fluids in the density range of 15.0 to 16.5 lb/gal. This failure is believed to be due to the structural changes of solvent and solute caused by the different concentration ratio of halogen to zinc ion. An especially preferred viscosifier system is disclosed in U.S. Pat. No. 4,762,627, issued Aug. 9, 1988.

The following Examples are provided for the purpose of further illustration of the preferred embodiment of the present invention and are not intended to be limitations on the disclosed invention.

EXAMPLE I

Tables 1 through 6, present the weight percents ("wt %") of the various salt constituents used in preparing drilling and completion fluids having densities in the range of 11.5 to 19.2 lb/gal. The specific gravity of these fluids is also given.

TABLE 1

Zinc Bromide/Lithium Bromide Fluid
Density, Specific Gravity, and Weight Percent

| Density at 70° F. lb/gal | Sp. Gr. | $ZnBr_2$ wt. % | LiBr wt. % |
|---|---|---|---|
| 13.5 | 1.62 | 2.2 | 52.4 |
| 13.8 | 1.66 | 7.0 | 49.0 |
| 14.1 | 1.69 | 11.5 | 45.7 |
| 14.4 | 1.73 | 14.5 | 43.6 |
| 14.7 | 1.77 | 20.2 | 39.5 |
| 15.0 | 1.80 | 24.1 | 36.7 |
| 15.3 | 1.84 | 28.0 | 34.0 |
| 15.6 | 1.87 | 31.7 | 31.2 |
| 15.9 | 1.91 | 35.2 | 28.8 |
| 16.2 | 1.95 | 38.7 | 26.3 |
| 16.5 | 1.98 | 42.0 | 23.9 |
| 16.8 | 2.02 | 45.2 | 21.6 |
| 17.1 | 2.05 | 48.2 | 19.4 |
| 17.4 | 2.09 | 51.2 | 17.3 |
| 17.7 | 2.13 | 54.0 | 15.3 |
| 18.0 | 2.16 | 54.8 | 14.7 |

TABLE 2

Zinc Bromide/Sodium Bromide Fluid
Density, Specific Gravity, and Weight Percent

| Density at 70° F. lb/gal | Sp. Gr. | $ZnBr_2$ wt. % | NaBr wt. % |
|---|---|---|---|
| 13.0 | 1.56 | 6.3 | 43.0 |
| 13.5 | 1.62 | 12.1 | 40.2 |
| 14.0 | 1.68 | 17.6 | 37.6 |
| 14.5 | 1.74 | 22.6 | 35.2 |

TABLE 2-continued

Zinc Bromide/Sodium Bromide Fluid
Density, Specific Gravity, and Weight Percent

| Density at 70° F. lb/gal | Sp. Gr. | $ZnBr_2$ wt. % | NaBr wt. % |
|---|---|---|---|
| 15.0 | 1.80 | 27.3 | 33.0 |
| 15.5 | 1.86 | 31.7 | 30.9 |
| 16.0 | 1.92 | 35.9 | 28.9 |
| 16.5 | 1.98 | 39.7 | 27.1 |
| 17.0 | 2.04 | 43.4 | 25.3 |
| 17.5 | 2.10 | 46.8 | 23.7 |

TABLE 3

Zinc Bromide/Potassium Bromide Fluid
Density, Specific Gravity, and Weight Percent

| Density at 70° F. lb/gal | Sp. Gr. | $ZnBr_2$ wt. % | KBr wt. % |
|---|---|---|---|
| 11.5 | 1.38 | 2.6 | 37.5 |
| 12.0 | 1.44 | 8.7 | 35.3 |
| 12.5 | 1.50 | 14.4 | 33.1 |
| 13.0 | 1.56 | 19.7 | 31.1 |
| 13.5 | 1.62 | 24.5 | 29.2 |
| 14.0 | 1.68 | 29.4 | 27.3 |
| 14.5 | 1.74 | 33.2 | 25.9 |
| 15.0 | 1.80 | 37.1 | 24.4 |
| 15.5 | 1.86 | 40.8 | 23.0 |
| 16.0 | 1.92 | 44.2 | 21.7 |
| 16.5 | 1.98 | 47.4 | 20.5 |
| 17.0 | 2.04 | 50.5 | 19.3 |
| 17.5 | 2.10 | 53.3 | 18.2 |
| 18.0 | 2.16 | 56.0 | 17.2 |

TABLE 4

Zinc Bromide/Sodium Bromide/Potassium Bromide Fluid
Density, Specific Gravity, and Weight Percent

| Density at 70° F. lb/gal | Sp. Gr. | $ZnBr_2$ wt. % | KBr wt. % | NaBr wt. % |
|---|---|---|---|---|
| 13.0 | 1.56 | 7.1 | 2.2 | 40.0 |
| 13.5 | 1.62 | 13.6 | 4.2 | 34.7 |
| 14.0 | 1.68 | 19.7 | 6.0 | 29.7 |
| 14.5 | 1.74 | 25.3 | 7.8 | 25.1 |
| 15.0 | 1.80 | 30.6 | 9.4 | 20.8 |
| 15.5 | 1.86 | 35.5 | 10.9 | 16.8 |
| 16.0 | 1.92 | 40.1 | 12.3 | 13.0 |
| 16.5 | 1.98 | 44.4 | 13.6 | 9.5 |
| 17.0 | 2.04 | 48.5 | 14.9 | 6.1 |
| 17.5 | 2.10 | 52.4 | 16.1 | 3.0 |
| 18.0 | 2.16 | 56.0 | 17.2 | 0.0 |

TABLE 5

Zinc Bromide/Potassium Bromide Fluid
Density, Specific Gravity and Weight Percent

| Density at 70° F. lb/gal | Sp. Gr. | $ZnBr_2$ wt. % | KBr wt. % |
|---|---|---|---|
| 11.5 | 1.38 | 3.0 | 37.0 |
| 12.0 | 1.44 | 10.0 | 33.5 |
| 12.5 | 1.50 | 16.5 | 30.3 |
| 13.0 | 1.56 | 22.5 | 27.3 |
| 13.5 | 1.62 | 28.0 | 24.3 |
| 14.0 | 1.68 | 33.1 | 21.9 |
| 14.5 | 1.74 | 37.9 | 19.5 |
| 15.0 | 1.80 | 42.3 | 17.3 |
| 15.5 | 1.86 | 42.5 | 20.0 |
| 16.0 | 1.92 | 42.7 | 22.5 |
| 16.5 | 1.98 | 42.9 | 24.9 |
| 17.0 | 2.04 | 43.1 | 27.1 |
| 17.5 | 2.10 | 43.3 | 29.3 |
| 18.0 | 2.16 | 43.4 | 31.2 |
| 18.5 | 2.22 | 43.6 | 33.1 |
| 19.0 | 2.28 | 43.7 | 34.9 |
| 19.2 | 2.31 | 43.8 | 35.6 |

TABLE 6

Zinc Bromide/Sodium Bromide Fluid
Density, Specific Gravity and Weight Percent

| Density at 70° F. lb/gal | Sp. Gr. | $ZnBr_2$ wt. % | NaBr wt. % |
|---|---|---|---|
| 13.0 | 1.56 | 7.7 | 41.4 |
| 13.5 | 1.62 | 14.9 | 37.1 |
| 14.0 | 1.68 | 21.5 | 33.2 |
| 14.5 | 1.74 | 27.7 | 29.5 |
| 15.0 | 1.80 | 33.5 | 26.0 |
| 15.5 | 1.86 | 35.1 | 27.3 |
| 16.0 | 1.92 | 36.5 | 28.5 |
| 16.5 | 1.98 | 37.9 | 29.6 |
| 17.0 | 2.04 | 39.2 | 30.7 |
| 17.5 | 2.10 | 40.4 | 31.7 |
| 18.0 | 2.16 | 41.5 | 32.6 |
| 18.5 | 2.22 | 42.6 | 33.5 |
| 19.0 | 2.28 | 43.6 | 34.4 |
| 19.2 | 2.31 | 44.0 | 34.7 |

All of the calcium-free fluids in the density range of 11.5 to 19.2 lb/gal described above may be prepared by mixing a two salt base fluid (e.g., 18.0 lb/gal $ZnBr_2$/KBr or 17.5 lb/gal $ZnBr_2$/NaBr) with single- or two-salt solutions having a lower density than the base fluid (e.g., 12.5 lb/gal NaBr or 15.0 lb/gal $ZnBr_2$/KBr). These fluids may also be formulated by mixing solutions of $ZnBr_2$ and LiBr, NaBr, or KBr and dry salts (e.g., 77 wt. % $ZnBr_2$, 54 wt. % LiBr, 46 wt. % NaBr, 38.5 wt. % KBr, and dry salts).

EXAMPLE II

A NaBr solution having a density of 12.5 lb/gal was prepared by mixing 46.0 wt. % solid NaBr and 54.0 wt. % water. A $ZnBr_2$/NaBr base fluid having a density of 17.5 lb/gal was prepared by combining 46.8 wt. % solid $ZnBr_2$, 23.7 wt. % solid NaBr, and 29.5 wt. % water. Varying amounts of $ZnBr_2$/NaBr base fluid (density, 17.5 lb/gal) were then mixed with different amounts of NaBr solution (density, 12.5 lb/gal) in order to prepare different completion fluids in the density range of 13.0 to 17.5 lb/gal. The volumes of the base fluid and NaBr solution required to formulate these different completion fluids, along with the respective densities and thermodynamic crystallization temperatures ("TCT") of the completion fluids, are given in Table 7.

TABLE 7

Blending Procedure-$ZnBr_2$/NaBr Fluid
Using 17.5 lb/gal $ZnBr_2$/NaBr and 12.5 lb/gal NaBr

| Density at 70° F. lb/gal | $ZnBr_2$/NaBr bbl | NaBr bbl | TCT, °F. |
|---|---|---|---|
| 12.5 | 0.000 | 1.000 | 21 |
| 13.0 | 0.100 | 0.900 | 18 |
| 13.5 | 0.200 | 0.800 | 15 |
| 14.0 | 0.300 | 0.700 | 10 |
| 14.5 | 0.400 | 0.600 | 1 |
| 15.0 | 0.500 | 0.500 | −16 |
| 15.5 | 0.600 | 0.400 | −3 |
| 16.0 | 0.700 | 0.300 | 9 |
| 16.5 | 0.800 | 0.200 | 23 |
| 17.0 | 0.900 | 0.100 | 37 |
| 17.5 | 1.000 | 0.000 | 47 |

The low pH and relatively low concentrations of the divalent salt in these fluids (compared with $ZnBr_2$/$CaBr_2$/$CaCl_2$ fluids) make them particularly suitable for use in formations with high carbonate and/or high sulfate concentrations.

EXAMPLE III

Another calcium-free completion fluid was prepared by mixing a ZnBr$_2$/LiBr base fluid with a LiBr solution. The 18.0 lb/gal ZnBr$_2$/LiBr base fluid was prepared by combining an appropriate volume of aqueous 77 wt % ZnBr$_2$ solution (density 20.3 lb/gal) with the requisite amount of aqueous 54 wt % LiBr solution (density, 13.4 lb/gal). Different ZnBr$_2$/LiBr fluids with densities in the range of 14.0 to 18.0 lb/gal were then formulated by combining varying amounts of the 18.0 lb/gal ZnBr$_2$/LiBr base fluid with different volumes of the aqueous 13.4 lb/gal LiBr solution. Table 8 provides the different volumes of base fluid and LiBr solution required to formulate these completion fluids and the thermodynamic crystallization temperatures of the fluids.

TABLE 8

Mixing Procedure-ZnBr$_2$/LiBr Fluid
Using 18.0 lb/gal ZnBr$_2$/LiBr and 13.4 lb/gal LiBr

| Density of 70° F. lb/gal | Composition for 1 bbl (42 gal) | | TCT, °F. |
|---|---|---|---|
| | ZnBr$_2$/LiBr bbl | LiBr bbl | |
| 13.5 | 0.030 | 0.960 | −60° F. |
| 13.8 | 0.097 | 0.93 | " |
| 14.1 | 0.164 | 0.826 | " |
| 14.4 | 0.209 | 0.781 | " |
| 14.7 | 0.298 | 0.687 | " |
| 15.0 | 0.362 | 0.618 | " |
| 15.3 | 0.428 | 0.552 | " |
| 15.6 | 0.496 | 0.484 | " |
| 15.9 | 0.557 | 0.418 | " |
| 16.2 | 0.625 | 0.350 | " |
| 16.5 | 0.691 | 0.284 | " |
| 16.8 | 0.759 | 0.216 | " |
| 17.1 | 0.820 | 0.150 | " |
| 17.4 | 0.890 | 0.085 | " |
| 17.7 | 0.956 | 0.019 | " |
| 18.0 | 1.000 | 0.000 | " |

EXAMPLE IV

A different calcium free completion fluid, ZnBr$_2$/KBr, was prepared in two ways. The 18.0 lb/gal base fluid was prepared by combining the appropriate amount of the aqueous 77 wt % ZnBr$_2$ solution with the requisite volume of the aqueous 38.5 wt % KBr solution (density, 11.3 lb/gal). This method of preparation was not preferred however because of the low density (i.e., 11.3 lb/gal) of the aqueous 38.5 wt % KBr solution. Mixing of the low density KBr solution with the ZnBr$_2$ solution resulted in a base fluid with an inordinately high ZnBr$_2$ concentration. The preferred method was to dilute the aqueous 77 wt % ZnBr$_2$ with water and then add the required weight of solid KBr to achieve a 18.0 lb/gal base fluid. This base fluid can then be mixed with the 11.3 lb/gal aqueous KBr solution to prepare different completion fluids having densities in the range of 11.5 to 18.0 lb/gal. Table 9 presents the various mixtures of base fluids and KBr solutions used to make the completion fluids of Example IV along with the thermodynamic crystallization temperatures for these completion fluids.

TABLE 9

Blending Procedure - ZnBr$_2$/KBr Fluid
Using 18.0 lb/gal ZnBr$_2$/KBr an 11.3 lb/gal KBr
Composition for 1 bbl (42 gal)

| Density at 70° F. lb/gal | ZnBr$_2$/KBr bbl | KBr bbl | TCT, °F. |
|---|---|---|---|
| 12.0 | 0.104 | 0.896 | 6 |
| 12.5 | 0.179 | 0.821 | |
| 13.0 | 0.254 | 0.746 | −8 |
| 13.5 | 0.328 | 0.672 | |
| 14.0 | 0.403 | 0.579 | −12 |
| 14.5 | 0.478 | 0.522 | |
| 15.0 | 0.552 | 0.448 | |
| 15.5 | 0.627 | 0.373 | −35 |
| 16.0 | 0.701 | 0.299 | |
| 16.5 | 0.776 | 0.224 | −64 |
| 17.0 | 0.851 | 0.149 | |
| 17.5 | 0.925 | 0.075 | −23 |
| 18.0 | 1.000 | 0.000 | |

Because of their low crystallization temperatures (6° to −64° F.), these completion fluids can be used during the winter months without danger of solidification.

EXAMPLE V

Another calcium-free fluid may be prepared by dissolving ZnBr$_2$, NaBr, and KBr salts in water. As an example of the numerous ways of preparing completion fluids, a 18.0 lb/gal ZnBr$_2$/KBr base fluid (prepared according to Example IV) was mixed with an aqueous solution of NaBr having a density of 12.5 lb/gal to formulate ZnBr$_2$/NaBr/KBr fluids having densities in the range of 13.0 to 18.0 lb/gal. The various volumes of the base fluid and NaBr solution used in these completion fluids are given in Table 10.

TABLE 10

Blending Procedure-ZnBr$_2$/KBr/NaBr Fluid
Using 18.0 lb/gal ZnBr$_2$/KBr and 12.5 lb/gal NaBr
Composition for 1 bbl (42 gal)

| Density at 70° F. lb/gal | ZnBr$_2$/KBr bbl | NaBr bbl |
|---|---|---|
| 13.0 | 0.091 | 0.909 |
| 13.5 | 0.182 | 0.818 |
| 14.0 | 0.273 | 0.727 |
| 14.5 | 0.364 | 0.636 |
| 15.0 | 0.455 | 0.545 |
| 15.5 | 0.546 | 0.454 |
| 16.0 | 0.636 | 0.364 |
| 16.5 | 0.727 | 0.273 |
| 17.0 | 0.818 | 0.182 |
| 17.5 | 0.909 | 0.091 |
| 18.0 | 1.000 | 0.000 |

EXAMPLE VI

Calcium-free completion fluids having densities greater than 18.0 lb/gal. may be prepared by dissolving a greater amount of solid monovalent salt (i.e., NaBr, KBr, or LiBr) into the base fluids than in the previous examples. For example, a 20.5 lb/gal. ZnBr$_2$/NaBr completion fluid was prepared by dissolving solid NaBr in a 17.5 lb/gal. ZnBr$_2$/NaBr base fluid. It has also been discovered that 19.2 lb/gal. calcium-free base fluids having low composition of ZnBr$_2$ (42–44 wt. %) may be prepared by dissolving solid monovalent salt into the zinc bromide solution. Owing to the high composition of monovalent salt in these base fluids, if they are blended down with lower density base fluids (i.e. 11.3 lb/gal. KBr, 12.5 lb/gal. NaBr, or 13.4 lb/gal. LiBr), solid monovalent salt will precipitate out of the solution (salting out). The problem was resolved by formulating an intermediate density base fluid (15.0 lb/gal.) by blending the 77 wt. % $ZnBr_2$ solution with the lower density base fluids. These new base fluids were then used with 19.2 lb/gal. fluids to blend up and with lower density base fluids to blend down.

The composition of $ZnBr_2$, in the new 19.2 lb/gal. base fluids is about 42.0–44.0 wt. %. Because of lower concentrations of $ZnBr_2$ in these base fluids compared with those used in Examples I–V, they are less corrosive to metal equipment than the base fluids used in the previous examples.

EXAMPLE VII

A 19.2 lb/gal $ZnBr_2$/KBr base fluid was prepared by adding 7.1 g water to 56.9 g 77 wt. % $ZnBr_2$ and then dissolving 36.0 g. solid 99 wt. % KBr into the resulting solution. The composition of this fluid is therefore 43.8 wt. % $ZnBr_2$, 35.6 wt. % KBr and 20.6 wt. % water.

A 15.0 lb/gal $ZnBr_2$/KBr base fluid was prepared by mixing 140.7 ml of 77 wt. % $ZnBr_2$ solution (d=20.3 lb/gal) with 209.8 ml of 38.5 wt. % KBr solution (d=11.3 lb/gal). The resulting fluid contained 42.3 wt. % $ZnBr_2$, 17.3 wt. % KBr and 40.4 wt. % water.

Tables 11 and 12 present the blending procedures for $ZnBr_2$/KBr fluids using 19.2 lb/gal $ZnBr_2$/KBr. 15.0 lb/gal $ZnBr_2$/KBr and 11.3 lb/gal KBr. The thermodynamic crystallization temperatures are also given in Tables 11 and 12.

TABLE 11

Blending Procedure for $ZnBr_2$/KBr Fluid Using 15.0 lb/gal $ZnBr_2$/KBr and 11.3 lb/gal KBr

| Density at 70° F. lb/gal | 15.0 lb/gal $ZnBr_2$/KBr bbl | 11.3 lb/gal KBr bbl | TCT, °F. |
|---|---|---|---|
| 11.5 | 0.054 | 0.946 | |
| 12.0 | 0.189 | 0.811 | 6.8 |
| 12.5 | 0.324 | 0.676 | |
| 13.0 | 0.460 | 0.540 | −0.4 |
| 13.5 | 0.595 | 0.405 | |
| 14.0 | 0.730 | 0.270 | −11.6 |
| 14.5 | 0.865 | 0.135 | |
| 15.0 | 1.000 | 0.000 | −36.0 |

TABLE 12

Blending Procedure for $ZnBr_2$/KBr Fluid Using 19.2 lb/gal and 15.0 lb/gal $ZnBr_2$/KBr

| Density at 70° F. lb/gal | 19.2 lb/gal bbl | 15.0 lb/gal bbl | TCT, °F. |
|---|---|---|---|
| 15.5 | 0.119 | 0.881 | |
| 16.0 | 0.238 | 0.762 | −27.9 |
| 16.5 | 0.357 | 0.643 | |
| 17.0 | 0.476 | 0.524 | −24.5 |
| 17.5 | 0.595 | 0.405 | |
| 18.0 | 0.714 | 0.286 | −12.6 |
| 18.5 | 0.833 | 0.167 | |
| 19.0 | 0.952 | 0.048 | |
| 19.2 | 1.000 | 0.000 | 3.0 |

EXAMPLE VIII

A 19.2 lb/gal $Zn_2$/NaBr base fluid was prepared by adding 8.2 g water to 57.1 g 77 wt. % $ZnBr_2$ solution and then dissolving 34.7 g 97 wt. % dry NaBr into the resulting solution. The composition of this fluid was therefore 44.0 wt. % $ZnBr_2$, 34.7 wt. % NaBr and 21.3 wt. % water. Another zinc bromide/sodium bromide base fluid (15.0 lb/gal) was prepared by mixing 112.4 ml of 77 wt. % $ZnBr_2$ solution (d=20.3 lb/gal) with 237.6 ml of 46.0 wt. % NaBr solution (d=12.5 lb/gal). The resulting fluid contained 33.5 wt. % $ZnBr_2$, 26.0 wt. % NaBr and 40.5 wt. % water.

Tables 13 and 14 present the blending procedures for $ZnBr_2$/NaBr fluids using 19.2 lb/gal and 15.0 lb/gal $ZnBr_2$,/NaBr, and 12.5 lb/gal NaBr. The thermodynamic crystallization temperatures for these fluids are also given in Tables 13 and 14.

TABLE 13

Blending Procedure for $ZnBr_2$/NaBr Fluid Using 15.0 lb/gal $ZnBr_2$/NaBr and 12.5 lb/gal NaBr

| Density at 70° F. lb/gal | 15.0 lb/gal $ZnBr_2$/NaBr bbl | 12.5 lb/gal NaBr bbl | TCT, °F. |
|---|---|---|---|
| 13.0 | 0.200 | 0.800 | 5.6 |
| 13.5 | 0.400 | 0.600 | |
| 14.0 | 0.600 | 0.400 | −35.3 |
| 14.5 | 0.800 | 0.200 | |
| 15.0 | 1.000 | 0.000 | −27.7 |

TABLE 14

Blending Procedure for $ZnBr_2$/NaBr Fluid Using 19.2 lb/gal and 15.0 lb/gal $ZnBr_2$/NaBr

| Density at 70° F. lb/gal | 19.2 lb/gal bbl | 15.0 lb/gal bbl | TCT, °F. |
|---|---|---|---|
| 15.5 | 0.119 | 0.881 | |
| 16.0 | 0.238 | 0.762 | 2.8 |
| 16.5 | 0.357 | 0.643 | |
| 17.0 | 0.476 | 0.524 | 24.4 |
| 17.5 | 0.595 | 0.405 | |
| 18.0 | 0.714 | 0.286 | 39.7 |
| 18.5 | 0.833 | 0.167 | |
| 19.0 | 0.952 | 0.048 | |
| 19.2 | 1.000 | 0.000 | 48.6 |

It is surprising that calcium-free high density fluids can successfully be prepared because such solutions contain such high levels of monovalent salt as to encounter "salting out" or crystallization. The solubilities of sodium bromide and potassium bromide in water are 46 percent and 38 percent, respectively. As disclosed in Table 5, a 19.2 ppg zinc bromide/potassium bromide fluid in accordance with this invention contains 36 percent by weight potassium bromide and 44 percent by weight zinc bromide. The total solids content is so high and the potassium bromide is employed at a level so close to its solubility limit in the solution, that it would be expected that the potassium bromide would "salt out" or crystallize from such a solution. Surprisingly, the 19.2 ppg solution described in Table 5 and the counterpart 19.2 ppg zinc bromide/sodium bromide solution disclosed in Table 6 of the application both are clear fluids which can be successfully used in accordance with this invention, a result that is quite surprising in view of these solubility data.

Conventionally used 19.2 ppg zinc bromide/calcium bromide solution contains about 54 percent zinc bromide and 23 percent calcium bromide. These materials are employed at levels well below their solubility limits in water (80 weight percent and 56 weight percent, respectively). Thus, no salting out problem is experienced with the conventional zinc/calcium solutions. Even assuming one were to conclude in light of the prior art that it would be desirable to eliminate calcium bromide from such compositions, it is surprising that the desired results can be achieved by combining zinc bromide and one or more alkali metal bromides.

The conventionally employed 19.2 lbs. per gallon zinc bromide/calcium bromide solutions contain about 16 percent $Zn^{2+}$ ions and about 5 percent $Ca^{2+}$ ions or a total divalent ion composition of about 21 percent. The 19.2 ppg zinc bromide/potassium bromide composition reported in Table 5 contains only about 13 percent $ZN^{2+}$ ions, thus containing a significantly lower level of the undesirable divalent ions. In sharp contrast, a 19.2 ppg zinc bromide solution containing about 75 percent zinc bromide has about 22 percent $Zn^{2+}$ ions As a result, the 19.2 ppg zinc bromide solution has an even higher divalent ion content than the zinc bromide/calcium bromide fluid and nearly twice as much divalent ion as the 19.2 ppg $ZnBr_2$/alkali metal halide solutions of this invention.

FORMATION DAMAGE EXPERIMENTS

Formation damage experiments have shown that, when 18.0 lb/gal $ZnBr_2$/KBr or 17.5 lb/gal $ZnBr_2$/NaBr completion fluids were mixed with a 2/8 ratio of formation brine having a high carbonate and/or high sulfate concentration, no precipitate was formed. However, when the same experiments were performed with a 18.0 lb/gal $ZnBr_2$/$CaBr_2$ completion fluid, a white precipitate was formed. In other experiments, 14.5 lb/gal $ZnBr_2$/NaBr and $ZnBr_2$/KBr completion fluids were mixed separately with a 3/7 ratio of formation brine and no precipitate was formed. However, when the same test was performed with a 14.5 lb/gal $ZnBr_2$/$CaBr_2$ completion fluid, a white precipitate was formed.

Considering the solubility products for calcium carbonate (i.e., $3.8 \times 10^{-9}$ at 25° C.) and zinc carbonate (i.e., $2.1 \times 10^{-11}$ at 25° C.), it would be expected that zinc carbonate and calcium carbonate would precipitate when $ZnBr_2$/NaBr or $ZnBr_2$/KBr completion fluids were mixed with formation brine. However, no precipitates formed with the solutions of this invention. The novelty of the present invention lies in the discovery that the substitution of either sodium bromide or potassium bromide for calcium bromide alters the expected reaction between zinc and carbonate ions such that no insoluble zinc carbonate precipitate is formed. Without being limited to the correctness of any particular theory this unusual effect may be due to a lower pH and a lower concentration of divalent metal ions in the calcium-free completion fluids than in the standard $ZnBr_2$/$CaBr_2$ completion fluids. Another possible explanation is that zinc bromide, sodium bromide, potassium bromide and lithium bromide may form double salts in aqueous solution, preventing zinc carbonate precipitation. Still another possible explanation is the formation of complex ions between zinc ions and bromide ions, i.e., $ZnBr^+$, $ZnBr_3^-$, $ZnBr_4^{2-}$, which may prevent the carbonate precipitation. Also, the reported solubility products for $CaCO_3$ and $ZnCo_3$ are those at infinite dilution or when the activity coefficient of the ions involved approach unity. In the concentrated salt solutions of the present invention, the activity coefficients of calcium, zinc and carbonate ions may, due to high ionic strength, be different than unity, and hence the reported values for solubility products of $ZnCO_3$ and $CaCO_3$ cannot be used as a criteria for predicting the formation of precipitates. Whatever the explanation, it is clear that most unexpectedly, the calcium-free fluids of this invention may quite successfully be employed with carbonate and sulfate containing formation brines without precipitation of insoluble zinc salts.

VISCOSIFICATION EXPERIMENTS

The calcium-free completion fluids of the present invention can be easily viscosified with any HEC-based liquid viscosifier. Tables 15 and 16 presents the funnel viscosities and rheology data for different $ZnBr_2$/NaBr and $ZnBr_2$/KBr fluids viscosified with HEC-based liquid viscosifier.

TABLE 15

Funnel Viscosity and Rheology Data for Calcium-Free Fluids ($ZnBr_2$/NaBr) Viscosified With 15 lb/bbl HEC-Based Liquid Viscosifier One Hour Mixing

| Fluid Density at 70° F. lb/gal | Funnel Viscosity (sec) | Fann RPM 600 | Fann RPM 300 | Apparent Viscosity cp | Plastic Viscosity cp | Yield Point lb/100 sq ft |
|---|---|---|---|---|---|---|
| 15.0 | 366 | 269 | 213 | 135 | 86 | 157 |
| 15.5 | 419 | 285 | 230 | 143 | 55 | 175 |
| 16.0 | 409 | OS | 241 | OS | OS | OS |
| 16.5 | 383 | OS | 240 | OS | OS | OS |
| 17.5 | 595 | OS | 279 | OS | OS | OS |
| 19.0 | 1195 | OS | OS | OS | OS | OS |

OS = off scale, greater than 300

TABLE 16

Funnel Viscosity and Rheology Data for Calcium-Free Fluids ($ZnBr_2$/KBr) Viscosified with 15 lb/bbl HEC-Based Liquid Viscosifier

| Fluid Density at 70° F. lb/gal | Funnel Viscosity (sec) | Fann RPM 600 | Fann RPM 300 | Apparent Viscosity cp | Plastic Viscosity cp | Yield Point lb/100 sq ft |
|---|---|---|---|---|---|---|
| 15.0 | 210 | 226 | 183 | 113 | 43 | 140 |
| 15.5 | 310 | 260 | 214 | 130 | 46 | 168 |
| 16.0 | 350 | 259 | 207 | 130 | 52 | 155 |
| 16.5 | 320 | 276 | 224 | 138 | 52 | 172 |
| 17.5 | 605 | OS | 289 | OS | OS | OS |
| 18.5 | 530 | OS | 286 | OS | OS | OS |
| 19.0 | 471 | OS | 281 | OS | OS | OS |

OS = off-scale, greater than 300

These data show that the 15 lb/bbl HEC-based liquid viscosifier was effective as a viscosifier for zinc ion-containing fluids in the density range of 15.5 to 19.0 lb/gal. The funnel viscosity measurements, which cannot be manipulated mathematically, are presented with the measurements obtained from the viscometer for purposes of permitting comparison of these completion fluids' viscosities. A viscosified fluid used as a "pill" should exhibit a funnel viscosity of about 200 sec. The data in Tables 15 and 16 indicate that concentrations of 10 to 15 lb/bbl of the HEC-based liquid viscosifier are sufficient to generated funnel viscosities of 200 sec.

TOXICITY EXPERIMENTS

Toxicity data for the calcium-free fluids of the present invention indicate that these fluids may be safely employed. While zinc bromide solution has been found to be a primary eye irritant, neither zinc bromide nor any of the monovalent salt solutions (LiBr, NaBr, and KBr) have been considered primary skin irritants. Table 17 contains $LD_{50}$ (i.e., the lethal dosage at which 50% of the test animals die) toxicity data from the 1981-82 Registry of Toxic Effects of Chemical Substances from the United States Department of Health, Education and Welfare. See also Sax, Dangerous Properties of Industrial Materials, 6th ed., or the Merck Index, 10th ed.

TABLE 17

| | Toxicity Data | |
| | Mammalian Toxicity $LD_{50}$ | |
| Type | $ZnBr_2$ | NaBr |
| --- | --- | --- |
| Oral-rats | 1047 mg/kg | 3500 mg/kg |
| Dermal-rats | over 2000 mg/kg | No data |
| Inhalation-rats | over 200 m/L | No data |

CORROSION INHIBITION

Seven day corrosion rates for calcium-free completion fluids in accordance with this invention were determined in a manner known to those skilled in the art using thioglycolate/ thiocyanate-based corrosion inhibitors. Specific corrosion inhibitors tested included a mixture of sodium thiocyanate, ammonium thioglycolate and sodium isoascorbate ("C.I.A."): calcium thiocyanate ("C.I.B."): and sodium thiocyanate "C.I.C."). Seven-day corrosion rates of mild steel coupons in calcium-free fluids inhibited with different corrosion inhibitors are presented in Table 18.

TABLE 18

Seven Day Corrosion Rates of Mild Steel Coupons in Calcium-Free Fluids

| Fluid Density at 70° F. (lb/gal) | | Temp. (°F.) | Inhibitor | Corrosion Rate (mpy) |
| --- | --- | --- | --- | --- |
| 18.0[a] | $ZnBr_2$/KBR | 300 | Blank | 610 |
| 18.0 | $ZnBr_2$/KBR | 300 | C.I.A. | 15 |
| 18.0 | $ZnBr_2$/KBR | 300 | C.I.B. | 20 |
| 17.0[b] | $ZnBr_2$/KBr | 350 | Blank | 350 |
| 17.0 | $ZnBr_2$/KBr | 350 | C.I.A. | 7 |
| 17.5[c] | $ZnBr_2$/NaBr | 300 | Blank | 456 |
| 17.5 | $ZnBr_2$/NaBr | 300 | C.I.A. | 14 |
| 17.5 | $ZnBr_2$/NaBr | 300 | C.I.B. | 19 |
| 14.5 | $ZnBr_2$/NaBr | 300 | Blank | 52 |
| 14.5 | $ZnBr_2$/NaBr | 300 | C.I.A. | 8 |
| 19.0[d] | $ZnBr_2$/KBr | 350 | Blank | 112 |
| 19.0 | $ZnBr_2$/KBr | 350 | C.I.A. | 9 |
| 19.0 | $ZnBr_2$/KBr | 350 | C.I.B. | 8 |
| 19.0 | $ZnBr_2$/KBr | 350 | C.I.C. | 8 |
| 19.0[e] | $ZnBr_2$/NaBr | 350 | Blank | 53 |
| 19.0 | $ZnBr_2$/NaBr | 350 | C.I.A. | 6 |
| 19.0 | $ZnBr_2$/NaBr | 350 | C.I.B. | 7 |
| 19.0 | $ZnBr_2$/NaBr | 350 | C.I.C. | 9 |

[a] 56.2 wt. % $ZnBr_2$/17.3 wt. % KBr
[b] 50.3 wt. % $ZnBr_2$/19.4 wt. % KBr
[c] 52.0 wt. % $ZnBr_2$/18.0 wt. % NaBr
[d] 43.2 wt. % $ZnBr_2$/35. wt. % KBr
[e] 42.5 wt. % $ZnBr_2$/34.5 wt. % NaBr

These data show that thioglycolate and thiocyanate group containing corrosion inhibitors act as effective corrosion inhibitors for zinc containing solutions of the present invention.

Seven-day mild steel corrosion data were also obtained for various sample solutions except that no corrosion inhibitors were employed. Table 19 reports the data for a 19.0 pound per gallon zinc bromide/sodium bromide in accordance with the present invention, a 19.2 ppg zinc bromide/calcium bromide fluid conventionally used; and a 19.2 pound per gallon zinc bromide fluid.

TABLE 19

| Solution | Corrosion(mpy) |
| --- | --- |
| 19.0 ppg $ZnBr_2$/NaBr (42.5% $ZnBr_2$/34.5% NaBr) | 53 |
| 19.2 ppg $ZnBr_2$/$CaBr_2$ (54% $ZnBr_2$/23% $CaBr_2$) | 180 |
| 19.2 ppg $ZnBr_2$ (75% $ZnBr_2$) | 1,147 |

These data demonstrate that the compositions of the present invention naturally exhibit corrosion rates less than ⅓ that of the conventionally employed zinc bromide/calcium bromide solutions and less than one-twentieth the level of the zinc bromide material.

We claim:

1. A clear, high-density calcium-free fluid adapted for use as well completion, packing and perforating media comprising an aqueous solution of about 44 percent by weight zinc bromide and about 35 up to about 36 percent by weight of at least one member selected from the group consisting of sodium bromide and potassium bromide, the solution having a density of about 19.2 pounds per gallon and a pH lying in the range of about 1.0 to 5.5.

2. A clear, calcium-free fluid, as claimed in claim 1, wherein the member is sodium bromide.

3. A clear, calcium-free fluid, as claimed in claim 1 wherein the member is potassium bromide.

4. A clear, calcium-free fluid, as claimed in claim 1, wherein the member is a mixture of sodium and potassium bromides.

5. A clear, high density calcium-free fluid, as claimed in claim 1, further comprising an effective amount of thioglycolate and/or thiocyanate containing corrosion inhibitor.

6. A clear, high density calcium-free fluid, as claimed in claim 1, and further comprising an effective amount of an hydroxyethyl cellulose-based viscosifying agent.

7. A method for drilling, completion or workover of wells comprising injecting into the well a clear, high-density calcium-free fluid, as claimed in claim 1.

* * * * *

UNITED STATES PATENT AND TRADEMARK OFFICE
CERTIFICATE OF CORRECTION

PATENT NO. : 4,941,982

DATED : July 17, 1990

INVENTOR(S) : Ahmad Dadgar, Charles C. Shin

It is certified that error appears in the above-identified patent and that said Letters Patent is hereby corrected as shown below:

Column 1, line 25, add a semicolon after the word "surface";

Column 1, line 26, add a semicolon after the word "zones";

Column 2, line 48, insert --ion-- between the words "calcium" and "containing";

Column 2, line 61 "i.e.." should be --i.e.,--;

Column 9, Table 8, line 2, "0.93" should be --0.893--;

Column 10, Table 9, line 2 of Title, "an" should be --and--;

Column 11, line 60, "Zn2" should be --ZnBr2--;

Column 13, line 5, "ZN2" should be --Zn2--;

Column 13, line 8, after "ions" insert --.--;

Column 13, line 55, "Co3" should be --CO3--;

Column 15, line 8 (line 3 Table 17), "m/L" should be --mg/L--;

Column 15, line 20, before "C.I.C." insert --(--;

UNITED STATES PATENT AND TRADEMARK OFFICE
CERTIFICATE OF CORRECTION

PATENT NO. : 4,941,982

DATED : July 17, 1990

INVENTOR(S) : Ahmad Dadgar, Charles C. Shin

It is certified that error appears in the above-identified patent and that said Letters Patent is hereby corrected as shown below:

IN THE CLAIMS:

Column 16, Claim 1, line 31, after "bromide" insert --, potassium bromide and mixtures of sodium bromide--

Signed and Sealed this

Twenty-fourth Day of December, 1991

Attest:

HARRY F. MANBECK, JR.

*Attesting Officer*     *Commissioner of Patents and Trademarks*